United States Patent
Wetzel et al.

(10) Patent No.: US 11,469,026 B1
(45) Date of Patent: Oct. 11, 2022

(54) FAST REGENERATIVE CURRENT CONTROL OF INDUCTIVE LOADS

(71) Applicant: U.S. Government as Represented by the Secretary of the Army, Dover, NJ (US)

(72) Inventors: Philip R. Wetzel, Great Meadows, NJ (US); Matthew H. Tomik, Easton, PA (US); Joshua P. Stapp, Mount Bethel, PA (US); William V. Hughes, Hardwick, NJ (US); Philip S. Floroff, Long Valley, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 225 days.

(21) Appl. No.: 16/367,621

(22) Filed: Mar. 28, 2019

(51) Int. Cl.
| | | |
|---|---|---|
| *F16K 31/06* | (2006.01) | |
| *H01F 7/18* | (2006.01) | |
| *H01H 9/00* | (2006.01) | |

(52) U.S. Cl.
CPC ............. *H01F 7/18* (2013.01); *F16K 31/06* (2013.01); *F16K 31/0655* (2013.01); *F16K 31/0679* (2013.01); *H01F 7/1811* (2013.01); *H01H 9/00* (2013.01)

(58) Field of Classification Search
CPC ........ H01F 7/18; H01F 7/1816; H01F 7/1811; H01H 9/00; F16K 31/06; F16K 31/0655; F16K 31/0679; H03K 17/732; H03K 17/162; H02H 9/047
USPC ........................................................ 361/160
See application file for complete search history.

(56) References Cited

U.S. PATENT DOCUMENTS

| | | | | |
|---|---|---|---|---|
| 5,202,820 A | * | 4/1993 | Miller ................... | H02M 7/538 363/132 |
| 5,995,356 A | * | 11/1999 | Glavmo ................. | F02D 41/20 361/154 |
| 7,405,918 B2 | * | 7/2008 | Cuplin ................ | H02M 3/1563 361/160 |
| 7,881,035 B2 | * | 2/2011 | Takahashi ............... | F04B 49/06 361/152 |
| 2019/0238124 A1 | * | 8/2019 | Tajima ................... | G01R 19/32 |

* cited by examiner

*Primary Examiner* — Danny Nguyen
(74) *Attorney, Agent, or Firm* — John P. DiScala

(57) ABSTRACT

An inductive driver circuit with improved speed of clamping down a powered solenoid element, which solenoid exhibits inductive properties, for purposes of rapid shut down of the solenoid.

1 Claim, 1 Drawing Sheet

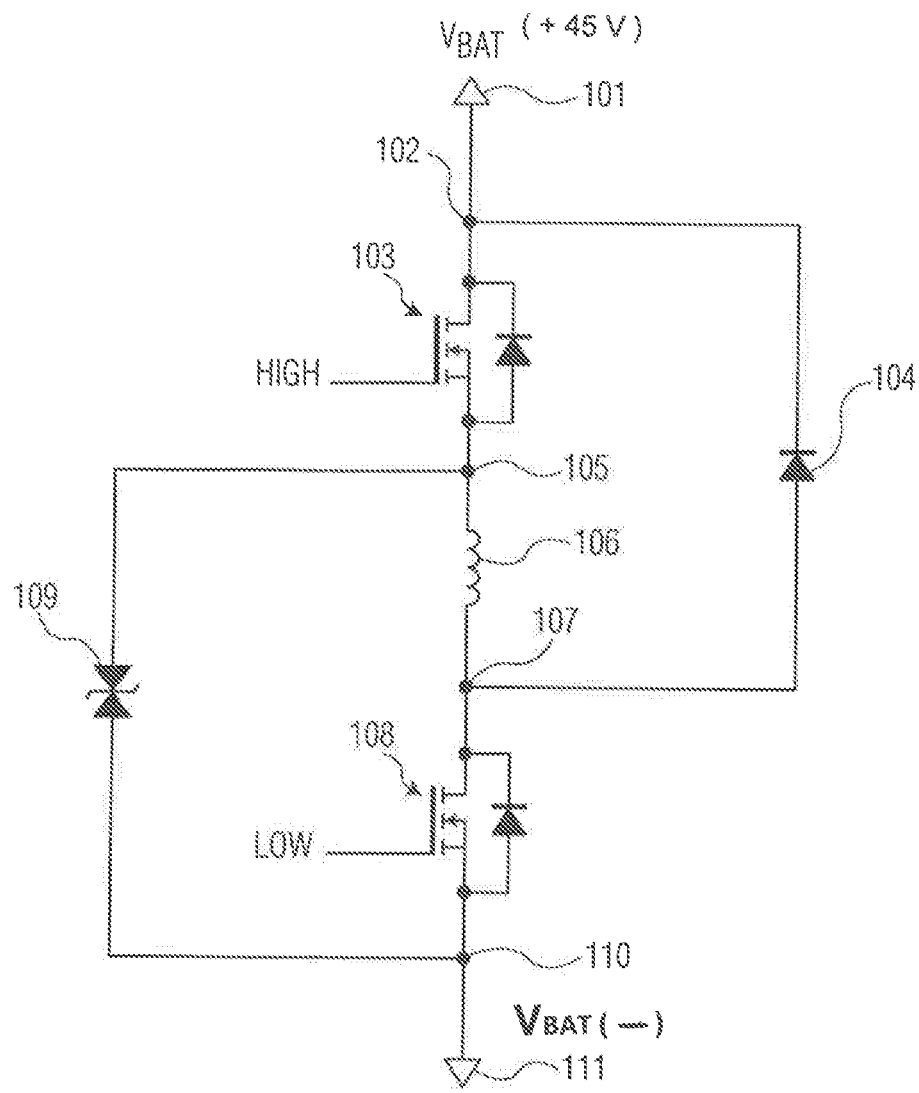

FAST REGENERATIVE CURRENT CONTROL OF INDUCTIVE LOADS

U.S. GOVERNMENT INTEREST

The inventions described herein may be made, used, or licensed by or for the U.S. Government for U.S. Government purposes.

BACKGROUND OF INVENTION

Many electromechanical systems use solenoids to convert electrical energy to mechanical energy. Solenoids generally have very high inductance, meaning that they resist changes to the current flowing through them. This presents challenges for control, as quickly moving a solenoid requires overcoming the inductance to quickly change the current flowing through it.

Fast release of solenoid force (by decreasing the energy/current in it) permits fast clamping of mechanical actuators in applications such as the following. In gun automation, fast clamping of trim-brake permits safe operation of a dynamically trimmed soft recoil weapon. Fast clamping of turret actuator brakes simplifies emergency stop controls, improving user safety. Fast clamping of weapon pointing brakes improves stability while firing and improves rate of fire. In commercial applications, in the automotive industry, fuel injector valves and safety systems, employ inventions with fast clamping actuators. In industrial automation, safety systems also employ inventions with fast clamping actuators.

A circuit design is needed that can more rapidly dissipate energy stored in a solenoid's inductor.

BRIEF SUMMARY OF INVENTION

This invention is an improvement for quickly eliminating a current already flowing in a first polarity in a solenoid 106 in an electromechanical system, even as the then existing source of that current is abruptly switched off by opening switches 103 and 108. A rapid decay of the first current is sought. To accelerate such decay, a transient voltage suppression (TVS) diode element 109 has been wired within the electromechanical system controls. It is used to maintain a significant voltage drop in a circuit path electrically in series with the circuit path already feeding solenoid 106. The inclusion of two switches 103 and 108 with freewheeling diode 104 keeps the supply potential between 101 and 111 also in series with solenoid 106. Requiring the current to flow across both voltage drops rapidly accelerates the decay of current by increased power dissipation (power being the product of voltage and current). In trial efforts, the design reduced the required time in shut down mode to sufficiently drop the current in the solenoid (enough to clack it shut) from 20 millisecond (current way) to now less than 1 millisecond. A control switch 103 is upsized rated in voltage blocking for large shutdown voltages.

Control switch 108 remains a traditionally rated switch that must only withstand the supply voltage between 101 and 111.

OBJECTS OF THE INVENTION

Accordingly, it is an object of the present invention to provide means in an electromechanical control system having a solenoid for fast clamping and fast release, to more rapidly be able to shut down operations in such system.

Another object of the present invention is to improve the inductive driver circuit in an electromechanical system having a solenoid, to more rapidly be able to dissipate energy stored in the solenoid's inductive elements, during rapid shutdown operations for the system.

These and other objects, features and advantages of the invention will become more apparent in view of the detailed descriptions of the invention, the claims, and in light of the following drawings wherein reference numerals may be reused where appropriate to indicate a correspondence between the referenced items. It should be understood that the sizes and shapes of the different components in the figures may not be in exact proportion and are shown here just for visual clarity and for purposes of explanation. It is also to be understood that the specific embodiments of the present invention that have been described herein are merely illustrative of certain applications of the principles of the present invention. It should further be understood that the geometry, compositions, values, and dimensions of the components described herein can be modified within the scope of the invention and are not generally intended to be exclusive. Numerous other modifications can be made when implementing the invention for a particular environment, without departing from the spirit and scope of the invention.

LIST OF DRAWINGS

The FIG. 1 shows an inductive driver circuit used in controlling an electromechanical system which has an inductor based solenoid activation component 106, in accordance with this invention.

DETAILED DESCRIPTION

This application hereby incorporates by reference, U.S. Pat. No. 7,433,171 by Vincent et al, entitled "Fast Current Control of Inductive Loads", issued Oct. 7, 2008. A circuit used in controlling the electromechanical system is shown in the FIG. 1. The circuit includes a solenoid 106, high side switch 103, low side switch 108, free wheel diode 104, and clamping diode 109. Clamping diode 109 could be a single transient voltage suppression (TVS) diode element or an opposed blocking/Zener diode pair, for example. Switch 103 might be an International Rectifier IPB320N20N3. Switch 108 might be an International Rectifier IRLR3636TRPBF. Diode 104 might be a ST STPS15H100C Schottky rectifier diode Zener diode pair 109 might be a Littlefuse 30KPA78CA. It clamps at a maximum of 130 VDC. Inductance at L1 might be in the single digits of Henrys. The power system might be approximately 45 VDC, positive from 101 to ground 111. The voltage source Vbat 101 at node 102 could be a battery, capacitor-coupled supply, or other type of supply that can accept temporary reverse current. Solenoid current is controllable by a microcontroller (not shown) manipulating switches 103 and 108. To first power up current through the solenoid, one would close both switches 103 and 108, then; to permit free-wheeling current through the solenoid, switch 103 would be closed but switch 108 would be opened, then; to quickly stop current through the solenoid, one would again close both switches 103 and 108 simultaneously. By alternating between powered and free-wheeling operation, a controller can drive arbitrary average currents through solenoid 106 by keeping high side switch 103 closed and pulse width modulating the low side switch 108. There is an improved speed at which current can be stopped when both switches 103 and 108 are opened with this invention. Speed of current shutdown is dependent on how much energy can be removed from the inductor. Power removed from the inductor is proportional to the voltage required to maintain a current (P=VI). This circuit functions in several ways: Inductor voltage during shutdown is made relatively high for given components. This design yields an inductor 106 voltage of (Clamping Diode 109 Voltage)+ (Battery 101 Voltage). This can be a substantial difference in the inductor voltage in high voltage applications. The inclusion of the battery voltage in inductor clamping voltage above causes less heating in the clamping diode for a given inductor voltage, allowing faster shutdown for a given clamping diode rating, and simplified heat management. It also reduces power utilization of the entire device. Switch 108 will not be exposed to high voltages. This is important because 108 is the switch used in all considered designs for pulse width modulation current control. A lower voltage requirement allows selection of a switch that is faster with lower on state resistance, and thus more efficient (due to less time spent in a linear region and less energy dissipation while on). Only 103 must be sized for large shutdown voltages.

It will be seen that the circuit has an inductive driver circuit with improved speed of clamping down an already powered inductor 106, comprising: a center circuit path comprising a first polarity of a battery power source 101 connected at a node 102, a high voltage braking switch 103 connected between node 102 and another node 105, and whereas said inductor 106 is connected between node 105 and a further node 107, a normal pulse width modulated switch 108 connected between node 107 and a yet further node 110, and a grounding means connected from node 110 to a ground 111, and; an absorption circuit path comprising a Zener diode means 109 serving as a high voltage snubber device connected between node 105 and node 110, and; a regenerative feature to conserve energy which comprises a flyback circuit path comprising a diode means 104 connected between node 107 and node 102, and; wherein the opposite polarity of the battery power source 101 is connected at ground 111, and whereupon to start up powering said inductor 106, both switches 103 and 108 are closed, to free wheel said inductor 106 thereafter, switch 108 is opened but switch 103 is left closed, and to clamp shut down said then already powered inductor, both switches 103 and 108 are then again closed.

While the invention may have been described with reference to certain embodiments, numerous changes, alterations and modifications to the described embodiments are possible without departing from the spirit and scope of the invention as defined in the appended claims, and equivalents thereof.

What is claimed is:

1. An inductive driver circuit with improved speed of clamping down an already powered inductor (106), said inductive driver circuit comprising:

a center circuit path comprising a first polarity of a voltage power source Vbat (101), wherein the voltage power source Vbat (101) is positive 45 volts direct current, wherein the Vbat (101) is connected at node (102) to a ground (111), wherein the voltage power source Vbat (101) comprises a battery, capacitor-coupled supply or other type supply that can accept a temporary reverse current, a high voltage braking switch (103) comprising a rectifier connected between the node (102) and another node (105), whereas said inductor (106) is connected between the another node (105) and a further node (107), and a normal pulse width modulated switch (108) comprising a rectifier is connected between the node (107) and a yet further node (110), and a grounding means is connected from the node (110) to the ground (111), an absorption circuit path comprising a zener diode means (109) serving as a high voltage snubber device connected between the another node (105) and node (110), and a flyback circuit path comprising a diode means (104) which includes a rectifier diode connected between the node (107) and the node (102), and wherein the opposite polarity of the voltage power source Vbat (101) is connected at the ground (111), and whereupon to start powering up said inductor (106), both switches (103) and (108) are closed, to free wheel said inductor (106), thereafter the switch (108) is opened but the switch (103) is kept closed, and to clamp shut down said already powered inductor, both said switches (103) and (108) are then again closed, and wherein the current in the inductor (106) is configured to collapse in 1 millisecond, and wherein the inductive driver circuit is used in a tank gun automation for fast clamping of soft recoil systems, for fast clamping of weapon pointing brakes to improve stability while firing, and for fast clamping of turret actuator brakes for stopping.

\* \* \* \* \*